(12) United States Patent
Xu

(10) Patent No.: US 11,048,802 B2
(45) Date of Patent: Jun. 29, 2021

(54) ENCRYPTED HARD DISK IMAGING PROCESS

(71) Applicant: X Development LLC, Mountain View, CA (US)

(72) Inventor: Sichun Xu, Santa Clara, CA (US)

(73) Assignee: X Development LLC, Mountain View, CA (US)

( * ) Notice: Subject to any disclaimer, the term of this patent is extended or adjusted under 35 U.S.C. 154(b) by 196 days.

(21) Appl. No.: 16/408,006

(22) Filed: May 9, 2019

(65) Prior Publication Data

US 2020/0356673 A1 Nov. 12, 2020

(51) Int. Cl.
*G06F 9/00* (2006.01)
*G06F 21/57* (2013.01)
*G06F 9/4401* (2018.01)
*H04L 9/32* (2006.01)

(52) U.S. Cl.
CPC .......... *G06F 21/575* (2013.01); *G06F 9/4401* (2013.01); *H04L 9/3226* (2013.01); *H04L 9/3234* (2013.01); *G06F 2221/034* (2013.01)

(58) Field of Classification Search
CPC .. G06F 21/575; G06F 9/4401; G06F 2221/34; H04L 9/3226; H04L 9/3234
USPC ............................................................. 713/2
See application file for complete search history.

(56) References Cited

U.S. PATENT DOCUMENTS

| | | | |
|---|---|---|---|
| 7,725,703 B2 | 5/2010 | Hunter et al. | |
| 8,190,916 B1 * | 5/2012 | Wang .................... | G06F 21/575 713/193 |
| 8,208,637 B2 | 6/2012 | Ellison | |
| 9,935,937 B1 | 4/2018 | Potlapally et al. | |
| 10,565,382 B1 * | 2/2020 | Diamant ................ | G06F 21/575 |
| 2003/0200450 A1 * | 10/2003 | England .............. | G06F 21/6218 713/189 |
| 2005/0268093 A1 * | 12/2005 | Proudler ................ | G06F 21/575 713/164 |
| 2006/0155988 A1 * | 7/2006 | Hunter ................... | G06F 21/575 713/164 |
| 2006/0161769 A1 * | 7/2006 | Hunter ................... | G06F 21/575 713/164 |
| 2006/0161784 A1 * | 7/2006 | Hunter ................... | G06F 21/575 713/182 |
| 2006/0242428 A1 * | 10/2006 | Tarkkala ............... | H04L 9/0897 713/189 |
| 2008/0133905 A1 * | 6/2008 | Challener ............. | H04L 9/3226 713/156 |
| 2008/0270781 A1 * | 10/2008 | Ibrahim ................. | G06F 21/57 713/2 |

(Continued)

*Primary Examiner* — Volvick Derose
(74) *Attorney, Agent, or Firm* — McDonnell Boehnen Hulbert & Berghoff LLP

(57) ABSTRACT

One method disclosed includes booting a computer with a bootloader, where the bootloader is stored on an unencrypted portion of a data storage device of the computer. The method further includes unsealing a decryption password for an encrypted portion of the data storage device from a trusted platform module (TPM) using a first sealing policy, where the first sealing policy excludes dependence on a first platform configuration register (PCR), wherein the first PCR stores a measurement result associated with the bootloader. The method subsequently includes sealing the decryption password into the TPM using a second sealing policy, where the second sealing policy includes dependence on the first PCR.

20 Claims, 7 Drawing Sheets

(56) References Cited

U.S. PATENT DOCUMENTS

| | | | |
|---|---|---|---|
| 2009/0154709 A1* | 6/2009 | Ellison | H04L 9/083 380/282 |
| 2010/0031370 A1* | 2/2010 | Ellison | G06F 21/57 726/27 |
| 2010/0082984 A1* | 4/2010 | Ellison | H04L 9/3236 713/170 |
| 2010/0088499 A1* | 4/2010 | Zimmer | G06F 21/10 713/2 |
| 2010/0115625 A1* | 5/2010 | Proudler | H04L 9/0836 726/27 |
| 2011/0126023 A1* | 5/2011 | Wang | G06F 21/62 713/182 |
| 2012/0179904 A1* | 7/2012 | Dunn | G06F 21/575 713/155 |
| 2012/0254602 A1* | 10/2012 | Bhansali | G06F 9/4406 713/2 |
| 2012/0297200 A1* | 11/2012 | Thom | G06F 21/6209 713/189 |
| 2013/0047197 A1* | 2/2013 | Saroiu | H04L 9/14 726/1 |
| 2013/0166869 A1* | 6/2013 | Wang | G06F 21/78 711/163 |
| 2016/0026810 A1* | 1/2016 | Hagiwara | G06F 21/575 713/193 |
| 2016/0048663 A1* | 2/2016 | Gillespie | G06F 21/45 726/6 |
| 2017/0076096 A1* | 3/2017 | Challener | G06F 21/53 |
| 2017/0201373 A1* | 7/2017 | Vijayakumar | G06F 21/6209 |
| 2017/0230179 A1* | 8/2017 | Mannan | H04L 9/0897 |
| 2019/0163898 A1* | 5/2019 | Clebsch | H04L 41/0893 |
| 2020/0099532 A1* | 3/2020 | Goldman | H04L 9/0897 |

* cited by examiner

| PCR Number 502 | Allocation 504 |
|---|---|
| 0 | BIOS |
| 1 | BIOS configuration |
| 2 | Option ROMs |
| 3 | Option ROMs configuration |
| 4 | MBR or UEFI boot loader |
| 5 | MBR or UEFI boot loader configuration |
| 6 | State transition and wake events |
| 7 | Platform manufacturer specific measurement |
| 8-15 | CoreOS GRUB measurement |
| 16 | Debug |
| 17-22 | DRTM measurement |
| 23 | Application support |

FIG. 5

ENCRYPTED HARD DISK IMAGING PROCESS

BACKGROUND

Modern computers have a boot process that occurs from when the power button is pressed to turn on a device until the device shows a conventional operating system or other runtime environment. Turning the power on may activate a processor. The processor may process code or instructions to activate a bootloader, a program designed to execute or operate before an operating system. The bootloader may be responsible for placing code or instructions for the operating system into memory. Before the operating system is allowed to load, a user may be required to enter a password to confirm that he or she is authorized to unlock the computer. Requiring a password during the boot process may protect sensitive information stored on a hard disk of the device.

SUMMARY

In one embodiment, a method is provided that includes booting a computer with a bootloader, where the bootloader is stored on an unencrypted portion of a data storage device of the computer. The method further includes unsealing a decryption password for an encrypted portion of the data storage device from a trusted platform module (TPM) using a first sealing policy, where the first sealing policy excludes dependence on a first platform configuration register (PCR), wherein the first PCR stores a measurement result associated with the bootloader. The method subsequently includes sealing the decryption password into the TPM using a second sealing policy, where the second sealing policy includes dependence on the first PCR.

In another embodiment, a computer is provided that includes a non-transitory computer readable medium containing instructions executable by at least one processor of the computer to cause the at least one processor to perform operations. The operations include booting a computer with a bootloader, where the bootloader is stored on an unencrypted portion of a data storage device of the computer. The operations further include unsealing a decryption password for an encrypted portion of the data storage device from a trusted platform module (TPM) using a first sealing policy, where the first sealing policy excludes dependence on a first platform configuration register (PCR), wherein the first PCR stores a measurement result associated with the bootloader. The operations subsequently include sealing the decryption password into the TPM using a second sealing policy, where the second sealing policy includes dependence on the first PCR.

In a further embodiment, a non-transitory computer readable medium is provided containing instructions executable by at least one processor of a computer to cause the at least one processor to perform operations. The operations include booting a computer with a bootloader, where the bootloader is stored on an unencrypted portion of a data storage device of the computer. The operations further include unsealing a decryption password for an encrypted portion of the data storage device from a trusted platform module (TPM) using a first sealing policy, where the first sealing policy excludes dependence on a first platform configuration register (PCR), wherein the first PCR stores a measurement result associated with the bootloader. The operations subsequently include sealing the decryption password into the TPM using a second sealing policy, where the second sealing policy includes dependence on the first PCR.

In another embodiment, a system is provided that includes means for booting a computer with a bootloader, where the bootloader is stored on an unencrypted portion of a data storage device of the computer. The system further includes means for unsealing a decryption password for an encrypted portion of the data storage device from a trusted platform module (TPM) using a first sealing policy, where the first sealing policy excludes dependence on a first platform configuration register (PCR), wherein the first PCR stores a measurement result associated with the bootloader. The system subsequently includes means for sealing the decryption password into the TPM using a second sealing policy, where the second sealing policy includes dependence on the first PCR.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 is a table illustrating platform configuration register (PCR) allocations, in accordance with example embodiments.

DETAILED DESCRIPTION

Figure 1:
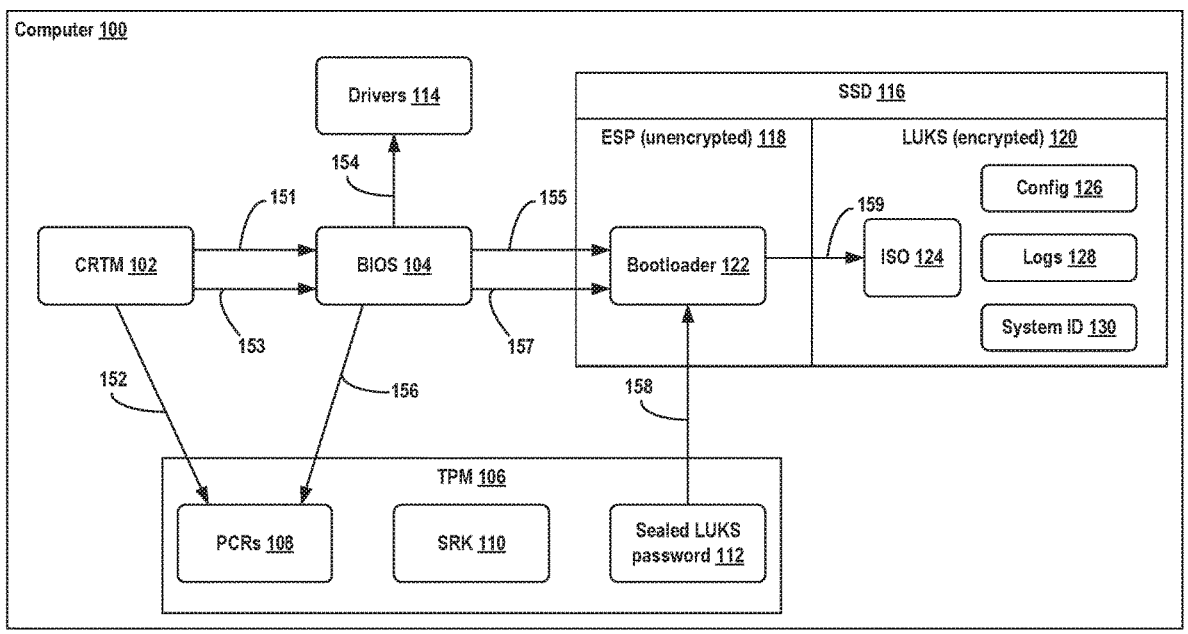
FIG. 1 illustrates a computer layout and an unseal process, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

An industrial personal computer (IPC) is a computer designed to be used in an industrial environment, such as a factory or a warehouse. An example IPC (also referred to as an IPC node) is a computer serving as a control system for a robotic device to which the IPC is mounted. The IPC may serve as the brain that processes sensor input and makes real-time control decisions for the robotic device. The IPC may also serve as a communication unit that receives missions and tasks from a central control system (e.g., a cloud-based server), and reports back statuses and events. In order to interact with a human operator, the IPC may include a touchscreen interface. The IPC may also include built-in persistent storage to store relevant data and information, such as programs, credentials, configurations, and logs. This type of IPC (as well as other types of computers) may need to be properly secured to protect confidential information.

More specifically, an IPC may need to be protected against both offline and online attacks. An offline attack is when an attacker steals an IPC node, extracts the hard drive, and tries to read the programs or customer data from the hard drive. In some examples, this attack can be defeated through full disk encryption (FDE). FDE involves protecting a hard drive or other data storage device on a computer with a decryption password. As long as an attacker does not have the decryption password, the attacker cannot access any sensitive information stored on the hard drive.

An online attack is when an attacker powers on the IPC and tries to gain privileged access to sensitive information while the system is running. In some examples, this type of attack can be defeated using trusted boot and tightening of all the input/output (IO) interfaces.

A challenge exists in how to manage a decryption password for a hard drive or other data storage device in such a way that an attacker cannot access the decryption password, whereas the boot process can access the decryption password. In many systems, this management of a decryption password is done by requiring an IPC operator to manually enter a password during the boot process. However, requiring password entry does not work well for some use cases. For instance, an IPC may not have an attached keyboard, making password entry difficult. In some examples, the only input device on an IPC is a touchscreen, which may be difficult to enable in a bootloader. Additionally, operators may be likely to use a password in an insecure fashion (e.g., by writing down the password on a piece of paper) in certain situations, such as when multiple operators share control of a single robotic vehicle. Instead of requiring manual password entry, an embedded trusted platform module (TPM) on an IPC may be used to protect a decryption password.

A TPM is a specialized computer chip (e.g., a dedicated microcontroller) designed to secure hardware through one or more integrated cryptographic keys. Because the TPM is a hardware-based security module on the motherboard, a decryption password can be put inside the TPM and may never leave the computer. If the hard drive is later removed from the computer, the decryption password cannot be accessed from another location and the data stored on the hard drive remains secure. Example systems and methods described herein involve applying FDE to an IPC node and using the embedded TPM to protect a disk decryption password and the integrity of the boot process.

When a decryption password is put inside the TPM, the decryption password can only be retrieved when the system is verified to be in a trusted state during the boot process. The system is verified by measuring one or more security relevant metrics associated with components such as the bootloader, the basic input/output system (BIOS), or the kernel. A checksum or other metric may be determined for each component. The TPM may only allow the decryption password to be read back when the metric matches the stored value for each component. If an attacker makes changes to the system (e.g., by changing the bootloader), the system will be locked and the attacker will be unable to retrieve the decryption password.

Using a TPM to store a disk decryption password may affect the imaging process to create a new IPC node. Creating a new IPC node may be done in an PC factory by plugging in a removable storage device such as a universal serial bus (USB) stick into a brand new IPC node. The IPC node may be booted from the USB stick as part of a bootstrap process to initialize the hard drive of the IPC node. In some examples described herein, the bootstrap process may be adjusted to support FDE.

The bootstrap process presents a potential problem because it may be necessary to boot into an IPC node in order to seal a decryption password into the TPM, but without the decryption password, it may not be possible to boot into the IPC node. The decryption password may be sealed into the TPM while booting from the USB stick. However, it won't be possible to retrieve the decryption password if the environment changes between the time when the decryption password is sealed into the TPM when booting from the USB stick and the later time when the decryption password needs to be unsealed from the TPM when booting from the hard drive.

To address this challenge, the bootstrap process may be divided into multiple stages. In an initial stage, after booting from the USB stick, the hard drive may be encrypted and the decryption password may be sealed into the TPM with a weak sealing policy. In particular, the weak sealing policy may not depend on a register associated with the bootloader. This allows a user at the factory to make changes to the bootloader (e.g., to add additional features or security fixes) from the version stored on the USB stick. In a subsequent stage, after booting into the encrypted partition of the hard drive, the decryption password may be resealed with a strong sealing policy, which depends on the register associated with the bootloader. After this first boot from the hard drive, the security level is therefore increased and subsequent changes to the bootloader (e.g., by an attacker outside the factory) may be prevented.

Theoretically, the same bootloader can be used on both the USB stick and the hard drive. However, requiring a matching bootloader between the USB stick and the hard drive is a strong and potentially undesirable coupling between the two components. In some example implementations, the USB stick uses a stock bootloader, which does not understand how to use a TPM. The bootloader on the USB stick may not need to understand the TPM because the USB stick is not encrypted. By contrast, the bootloader on the hard drive may be a custom developed bootloader, which understands how to use a TPM and disk encryption. Using the same custom bootloader on the USB stick would require additional development work to make the bootloader generic and capable of supporting both cases. Additionally, it may be desirable to make changes to the custom bootloader over time. As a result, there may be multiple versions of custom bootloaders in the field. Always requiring the support USB stick to have the same bootloader as each IPC node is a heavy burden.

Besides the inflexibility and cost of requiring the two bootloaders to be the same, there is also a security benefit in using the two-phase approach. In the two-phase approach, the strong policy may potentially include other signatures, such as the source of the boot: a USB stick or a hard drive. Including the boot source in the strong policy will completely stop an attacker from retrieving the disk encryption password if the attacker is booting from a USB stick.

By contrast, in a one-phase approach, the boot source cannot be used to protect the encryption password. Overall, decoupling the bootloaders has a number of potential benefits and is therefore the preferred approach in some applications.

It may also be desirable to ensure that the multistage process is completed within the factory before the IPC node is shipped for installation. If the IPC node is shipped right after the decryption password is initially sealed into the TPM but before reboot and reseal, the decryption password will only be sealed with a weak sealing policy. An attacker may then swap the bootloader and decrypt the encrypted portion of the hard drive.

In some examples, to make sure that the reseal and security level increase occurs in the factory, the imaging process may be strengthened by binding the second boot with the bootstrap USB stick. Instead of sealing the decryption password into the TPM directly, an encrypted version of the decryption password may be sealed into the TPM. In particular, the decryption password may first be encrypted using a unique identifier derived from the files on the USB stick. This way, when the bootstrap USB stick is not present, the bootloader or an attacker will not be able to extract the decryption password. A manufacturer may therefore be forced to go through the full process of resealing the decryption password with the strong sealing policy before shipping out an IPC node. There are several possible options for deriving an encryption key from the USB stick. One possible option is to use a static certificate stored on the USB stick, which may be unique per USB stick.

Referring now to the Figures, FIG. 1 illustrates a computer layout and an unseal process, in accordance with example embodiments. More specifically, a computer 100 is illustrated in a state after completion of the imaging process.

The computer 100 may be an IPC node, which may be used, for instance, as a control system for a robotic device. The computer 100 may include a core root of trust for measurement (CRTM) 102, BIOS 104, TPM 106, drivers 114, and solid-state drive (SSD) 116.

This illustrative example design uses Linux Unified Key Setup (LUKS) as a disk encryption tool to encrypt the hard drive. Other encryption tools may also be used, such as those provided by VeraCrypt or BitLocker®. Because computer 100 includes only a single SSD, SSD 116 may be divided into an encrypted partition and an unencrypted partition so that the decryption program itself is left unencrypted. More specifically, SSD 116 may include one bootable unencrypted extensible firmware interface (EFI) system partition (ESP) 118 and one LUKS encrypted partition 120. The bootable ESP partition 118 contains a single bootloader file 122. All the other files are stored in the LUKS encrypted partition 120, such as ISO image 124, configuration file 126, log file 128, and system identifier (ID) 130.

The decryption program, combined with other booting functions, can be packaged into a single bootloader 122. The bootloader 122 can then be measured by firmware and the measurement result can be extended to a particular platform configuration register (PCR) such as PCR 4 of PCRs 108 inside TPM 106. A PCR is a register of a TPM which is used for storing data representing a particular aspect of the computer. If bootloader 122 is modified by an attacker, even by a single bit, the measurement result in PCR 4 would be different. This difference may be used to control whether the LUKS decryption password can be extracted or not.

TPM 106 will store sealed LUKS password 112, which is a decryption password that has been sealed using the seal operation of the TPM specification. The seal operation can be configured to use the contents of one or more particular registers of PCRs 108 (including PCR 4) combined with a hidden storage primary key (SRK 110) to encrypt the LUKs password as sealed LUKS password 112. SRK 110 may be generated upon a user's request and remains hidden and unchanged until the user requests to clear it. PCR 4 may be captured at the time of the seal operation.

The reverse operation, unseal, is used to recover the LUKS password. The unseal operation uses the content of one or more particular registers of PCRs 108 (including PCR 4) and SRK 110 to decrypt the sealed LUKS password 112. Unseal will only succeed if SRK 110 and PCR 4 have the same respective values as when the LUKS password was sealed.

If the bootloader 122 is tampered with, PCR 4 will have a different measurement result. When PCR 4 stores a different value, the unseal operation will fail. When the bootloader 122 is not tampered with, PCR 4 will store the same value and the unseal operation will succeed.

An illustrative example booting and disk decryption process may be followed to extend the root of trust from when the system powers on until the entire hard drive is decrypted. In FIG. 1, arrows are illustrated representing steps 151 through 159 of such a process. At step 151, after the system is powered on, CRTM 102 measures the BIOS 104. At step 152, measurements of the BIOS 104 are extended to registers of PCRs 108, such as PCR 0 and PCR 1. At step 153, control is then transferred from CRTM 102 to BIOS 104.

At step 154, BIOS 104 measures the drivers 114. At step 155, BIOS 104 measures the bootloader 122. At step 156, BIOS 104 extends the measurement results associated with the drivers 114 and the bootloader 122 to registers of PCRs 108, such as PCR 2, PCR 3, PCR 4, and PCR 5. At step 157, BIOS 104 transfers control to the bootloader 122.

At step 158, the bootloader 122 attempts to unseal the sealed LUKS password 112 from TPM 106. This unseal step will succeed if and only if the relevant registers of PCRs 108 contain the same values as when the LUKS password is sealed. At step 159, the bootloader 122 decrypts the LUKS partition 120 using the LUKS password. Once SSD 116 has been fully decrypted, additional steps of the boot process may then follow, such as loading and transferring control to a kernel. By contrast, if bootloader 122 has been tampered with, the boot process may not proceed past step 158.

Figure 2:
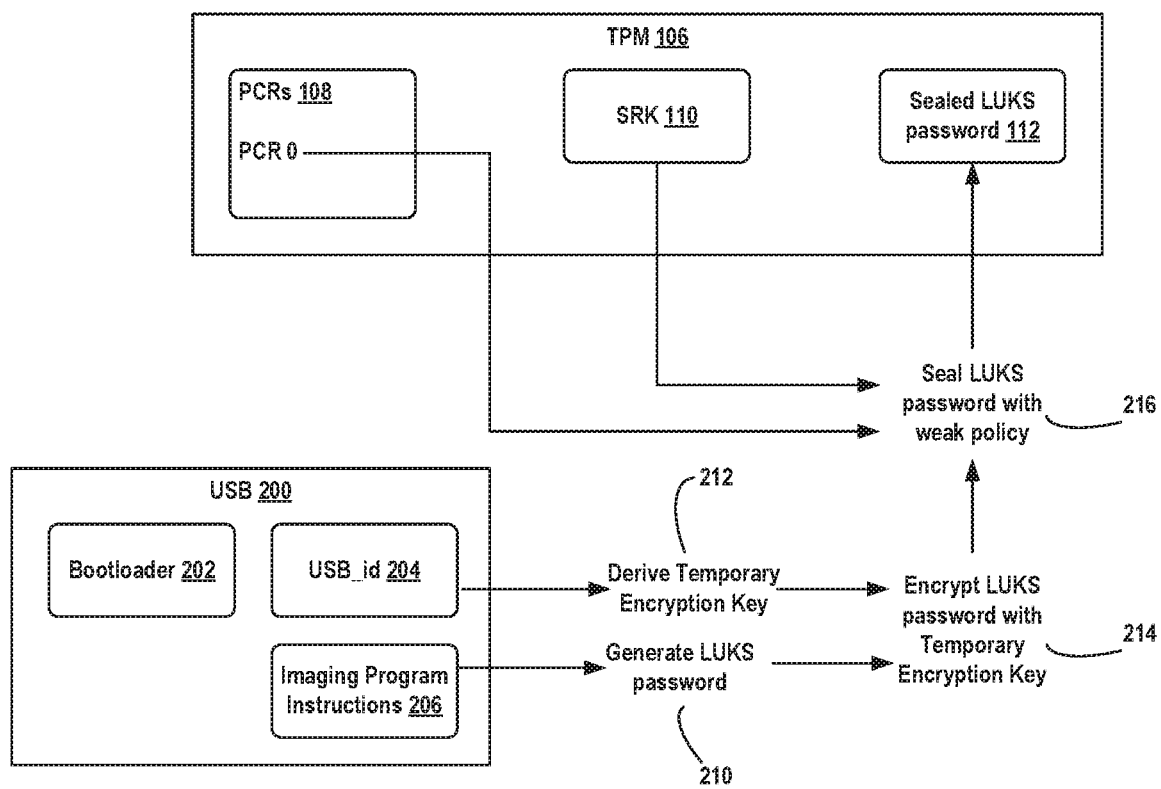
FIG. 2 illustrates sealing a password into a trusted platform module (TPM) using a weak policy, in accordance with example embodiments.

Next, FIG. 2 illustrates sealing a password into a trusted platform module (TPM) using a weak policy, in accordance with example embodiments. More specifically, a decryption password may be generated by USB stick 200 and sealed within TPM 106 after booting a new IPC node from USB stick 200. The USB stick 200 may first partition the hard drive of the IPC node into an unencrypted partition (e.g., an ESP partition) and a data partition to be encrypted (e.g., a LUKS partition). The USB stick 200 may set up both partitions by copying the bootloader 202 to the unencrypted partition and by copying other relevant data files to the data partition.

In order to encrypt the data partition, USB stick 200 may need to generate a disk decryption password (e.g., a LUKS password). USB stick 200 may include imaging program instructions 206 which can be run by a processor of an IPC node to generate the LUKS password, as shown by step 210. Generating the LUKS password may involve the imaging program instructions 206 generating a random number to use as the LUKS password. After the LUKS password is generated, the LUKS password may be used to encrypt the data partition of the IPC node.

To ensure that the reboot and reseal process is fully completed, the LUKS password (e.g., the generated random number) may be adjusted with an identifier USB_id 204 associated with the USB stick 200. For instance, USB_id 204 may be a static certificate which is unique to USB stick 200. In order to apply USB_id 204, a temporary encryption key may be derived based on USB_id 204, as shown by step 212.

Before sealing the generated LUKS password, the imaging program instructions 206 may be executed to encrypt the LUKS password with the temporary encryption key, as shown by step 214. The encrypted LUKS password is therefore dependent on USB_id 204. The USB stick 200 may then be required to be attached to the IPC node in order to boot the IPC node from the hard drive of the IPC node the first time. After the LUKS password has been encrypted by the temporary encryption key, the imaging program instructions 206 may then be executed to seal the encrypted LUKS password into TPM 106, as shown by step 216.

In order to seal the LUKS password, a first sealing policy may be used by imagining program instructions 206. The first sealing policy may be considered a weak sealing policy because the first sealing policy does not depend on one or more PCRs which will later be used for a second, strong sealing policy. In particular, the weak sealing policy may not depend on a PCR associated with the bootloader. Consequently, a user at the factory may be able to make changes to the bootloader (e.g., use a different version than bootloader 202 stored on USB stick 200) before booting from the hard drive the first time. In some examples, a different version of the bootloader 202 may be used as long as the version is signed.

Notably, it may not be practical to change the USB sticks used for imaging after they are sent to a factory. Consequently, the USB sticks may store an antiquated version of the bootloader or other files, which may need to be adjusted when imaging a new IPC node.

In the example illustrated in FIG. 2, the weak sealing policy may depend only on a single PCR of PCRs 108 (PCR 0), which may store a measurement result associated with the BIOS. In other examples, a different set of one or more PCRs may be used for the weak sealing policy. In yet further examples, the LUKS password may initially be stored in TPM 106 in a manner that does not require sealing or dependence on any of PCRs 108 at all (although some security may be sacrificed in this case).

The one or more chosen PCRs from PCRs 108 and the SRK 110 may be used to encrypt the LUKS password as sealed LUKS password 112 within TPM 106. In order to later unseal the LUKS password, each of the chosen PCRs must store the same values as they did at the time of sealing.

In alternative examples, the LUKS password (or other decryption password) may be directly sealed into the TPM 106 without first deriving and applying a temporary encryption key associated with an identifier of USB 200.

In further examples, one or more of the illustrated operations may be performed by a different source than a USB stick. For instance, generation of the decryption password may be performed by the TPM 106 itself.

Figure 3:
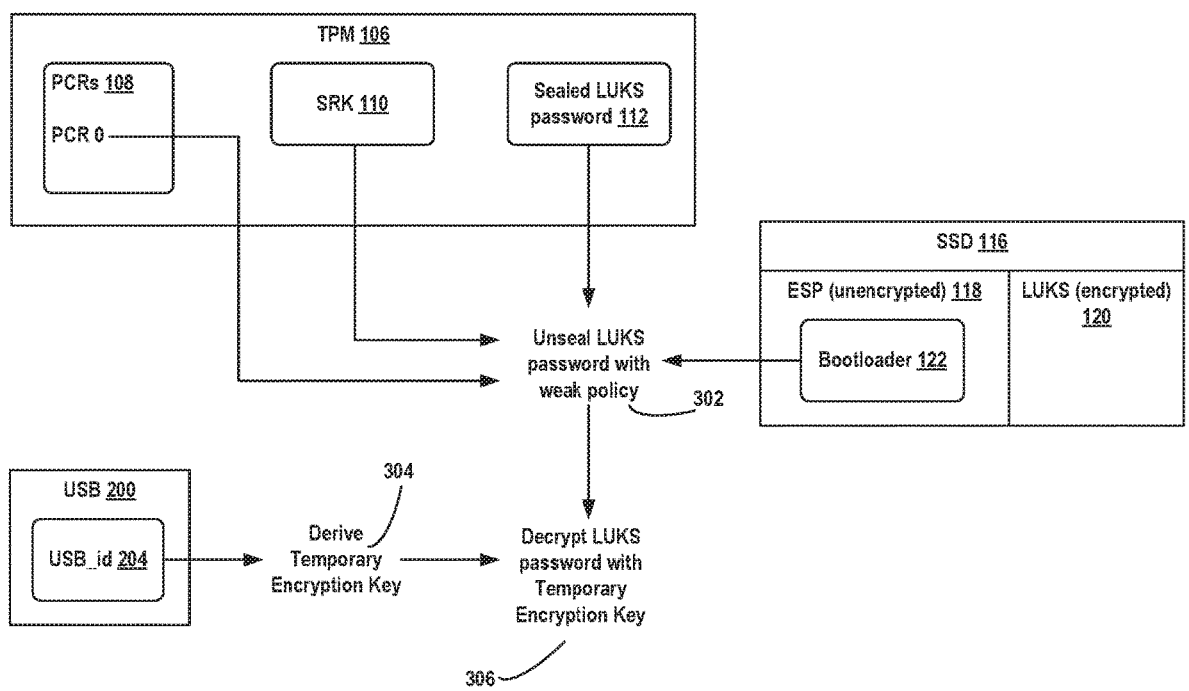
FIG. 3 illustrates unsealing a password from a TPM using a weak policy, in accordance with example embodiments.

Next, FIG. 3 illustrates unsealing a password from a TPM using a weak policy, in accordance with example embodiments. More specifically, a disk decryption password (e.g., a LUKS password) may be unsealed from a TPM after booting a computer (e.g., an IPC node) from the hard drive for the first time. In examples where a temporary encryption key has been derived from a USB stick, the USB stick may need to be plugged in to the IPC node when booting from the hard drive for the first time to remove dependence on the USB stick.

In reference to FIG. 3, the bootloader 122 stored on the unencrypted ESP partition of SSD 116 may be executed by a processor of the IPC node. For instance, the BIOS may measure the bootloader 122 and then transfer control to the bootloader 122. The bootloader 122 may initially try to unseal the sealed LUKS password 112 from TPM 106 using the strong policy. Because the sealed LUKS password 112 was sealed with a weak policy (and a different set of PCRs), this initial unseal attempt will fail.

The bootloader 122 may then attempt to unseal the sealed LUKS password 112 from TPM 106 using the weak policy, as shown by step 302. This unseal operation may be expected to succeed as long as the one or more PCRs associated with the weak policy have the same value as they did at the time of the seal operation. For instance, PCR 0 of PCRs 108 may store a measurement result associated with the BIOS, which may be expected to remain unchanged. Consequently, the value in PCR 0 and the SRK 110 of TPM 106 may be the same as they were at the time of the seal operation, allowing the bootloader 122 to unseal the sealed LUKS password 112.

The bootloader 122 may then derive the temporary encryption key from the USB_id 204 of attached USB stick 200, as shown by step 304. For instance, USB_id 204 may be a static certificate, and the temporary encryption key may be generated again by applying a predetermined transformation to the USB_id 204. After the temporary encryption key has been derived, the temporary encryption key may be applied to decrypt the LUKS password, as shown by step 306.

After determining the LUKS password, the bootloader 122 may use the LUKS password to decrypt and mount the LUKS partition 120 of SSD 116. At this point, sealed LUKS password 112 is still sealed with the weak sealing policy. In order to increase the security level, the LUKS password may be resealed with a strong sealing policy. In some examples, the bootloader 122 may transfer control to a reseal script in order to reseal the decryption password into TPM 106. In some examples, the reseal script may be part of an ISO stored in the LUKS partition 120 of SSD 116. The ISO may have been copied from USB stick 200 into the LUKS partition 120 by imagining program instructions stored on USB stick 200. In alternative examples, the reseal script or other reseal program instructions may be stored in and/or run from a different location.

Figure 4:
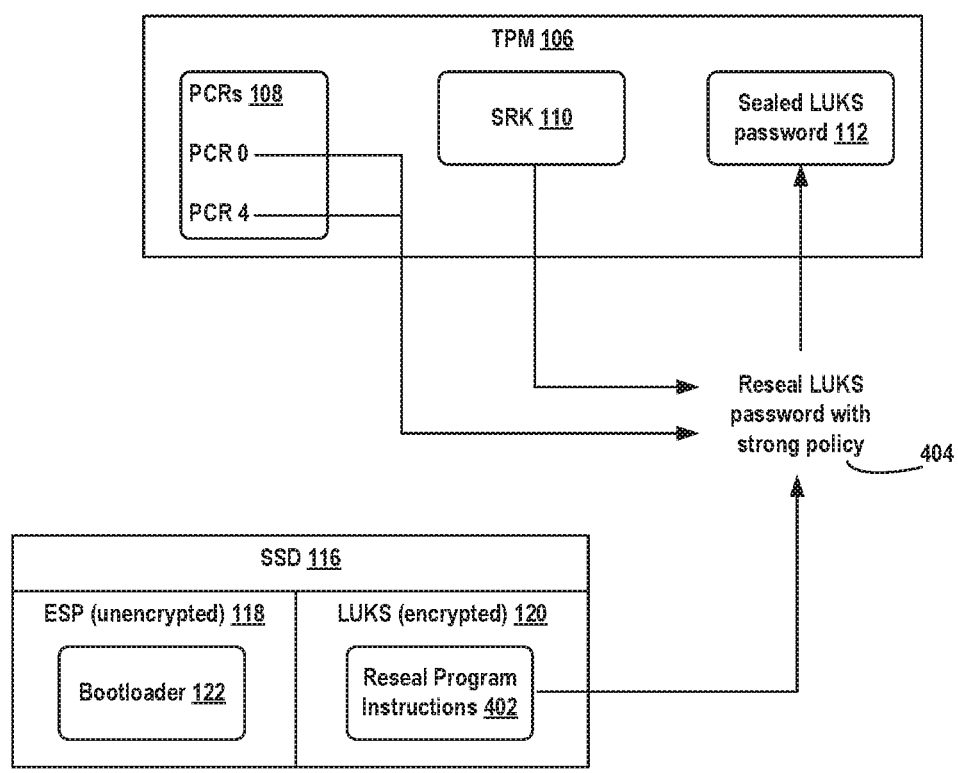
FIG. 4 illustrates resealing a password into a TPM using a strong policy, in accordance with example embodiments.

Next, FIG. 4 illustrates resealing a password into a TPM using a strong policy, in accordance with example embodiments. More specifically, after bootloader 122 gains access to encrypted LUKS partition 120 of SSD 116, control may be transferred from the bootloader 122 to reseal program instructions 402 stored on LUKS partition 120. The reseal program instructions 402 may take the form of a reseal script. The reseal program instructions 402 may be configured to reseal the sealed LUKS password 112 with a strong sealing policy as shown by step 404 in order to increase the security level and complete the imaging process.

In some examples, the reseal program instructions 402 may first unseal the sealed LUKS password 112 using the weak sealing policy. If the LUKS password was encrypted with a temporary encryption key, the reseal program instructions 402 may also decrypt the LUKS password with the temporary encryption key before resealing the LUKS password.

In order to reseal the LUKS password with the strong sealing policy, additional PCR values of PCRs 108 may be considered than those used for the weak sealing policy. For instance, in reference to FIG. 4, the measurement results in both PCR 0 and PCR 4 may be considered in addition to SRK 110. PCR 4 may depend on the bootloader 122. Therefore, after the resealing with the strong sealing policy is complete, no more changes to the bootloader 122 may be permitted. The sealed LUKS password 112 may only be unsealed later if the values in PCR 0 and PCR 4 are the same as they were at the time of sealing.

In some examples, the strong sealing policy may also depend on the source of the boot process. In particular, the strong sealing policy may require that a hard drive was the boot source, and prevent unsealing of the sealed LUKS password 112 when the boot source was a USB stick. By contrast, the weak sealing policy may not depend on the boot source.

Completion of the imaging process may be indicated to the user, for instance by providing five long beeps. In some examples, the full imaging process may happen in a relatively short period of time (e.g., a few minutes).

Subsequently, an IPC node may be booted without an attached USB stick. The strong sealing policy may be used successfully to unseal the LUKS password. The LUKS password may then be used to decrypt and mount the LUKS partition. The boot process may proceed as illustrated and described with respect to FIG. 1.

In some examples, maintenance, such as a firmware update or device replacement may trigger a TPM to generate a different PCR value, which in turn will prevent an IPC node from booting. To allow maintenance personnel to always have a way to decrypt the hard drive, the disk decryption password may be uploaded to a server during a registration process for the IPC node. This approach may be more secure and auditable than creating a master password which can decrypt all IPC node hard drives. Based on the disk decryption password, a recovery USB stick may be created which allows an IPC node to be updated and subsequently allows for resealing of the disk decryption password.

In further examples, the recovery process can reuse the reseal program code developed for the imaging process. With proper authorization, the recovery USB stick can download the disk decryption password from the server. With the decryption password, the recovery USB stick can encrypt the disk decryption password with a static certificate and seal the encrypted disk decryption password into the TPM with a weak sealing policy. Then the IPC node may be rebooted and control may be transferred to the reseal program code to reseal the disk decryption password with a strong sealing policy.

Next, FIG. 5 is a table illustrating platform configuration register (PCR) allocations, in accordance with example embodiments. In general, a TPM device contains multiple PCRs. The table 500 illustrated includes a PCR number column 502 and a corresponding allocation column 504. A given PCR in the PCR number column 502 stores a measurement result (e.g., checksum) representative of the corresponding component in the allocation column 504. For instance, PCR 0 stores a measurement result associated with the BIOS and PCR 4 stores a measurement result associated with the bootloader.

In some examples, only PCR 0 may be used for the weak sealing policy. Relying only on PCR 0 (and the BIOS) may be the lowest level allowed by the TPM. In further examples, other PCRs or combinations of PCRs may be used for the weak sealing policy. In additional examples, no PCRs may be needed for the weak sealing policy.

In some examples, the strong sealing policy may depend on PCR 0 (BIOS), PCR 2 (Option ROMs), PCR 3 (Option ROMs configuration), PCR 4 (bootloader), and PCR 7 (platform manufacturer specific measurement). PCR 1 (BIOS configuration) may not be included because the value will change whenever the BIOS settings change. It may be unnecessary to prevent any changes to the BIOS settings. PCR 5 (bootloader configuration) may not be included because by controlling the bootloader, it can be ensured that the bootloader configuration will not cause any harm. PCR 6 (state transition and wake events) may not be included because it may be undesirable for power on/off events to affect the system boot. In further examples, other PCRs or combinations of PCRs may be used for the strong sealing policy.

In additional examples, a TPM with different PCR allocations may be used to implement the concepts described herein. Additionally, although this description generally focuses on TPMs, PCRs, and the personal computer platform, it should be understood that the concepts may in further examples be extended to different types of hardware security modules (HSMs).

Figure 6:
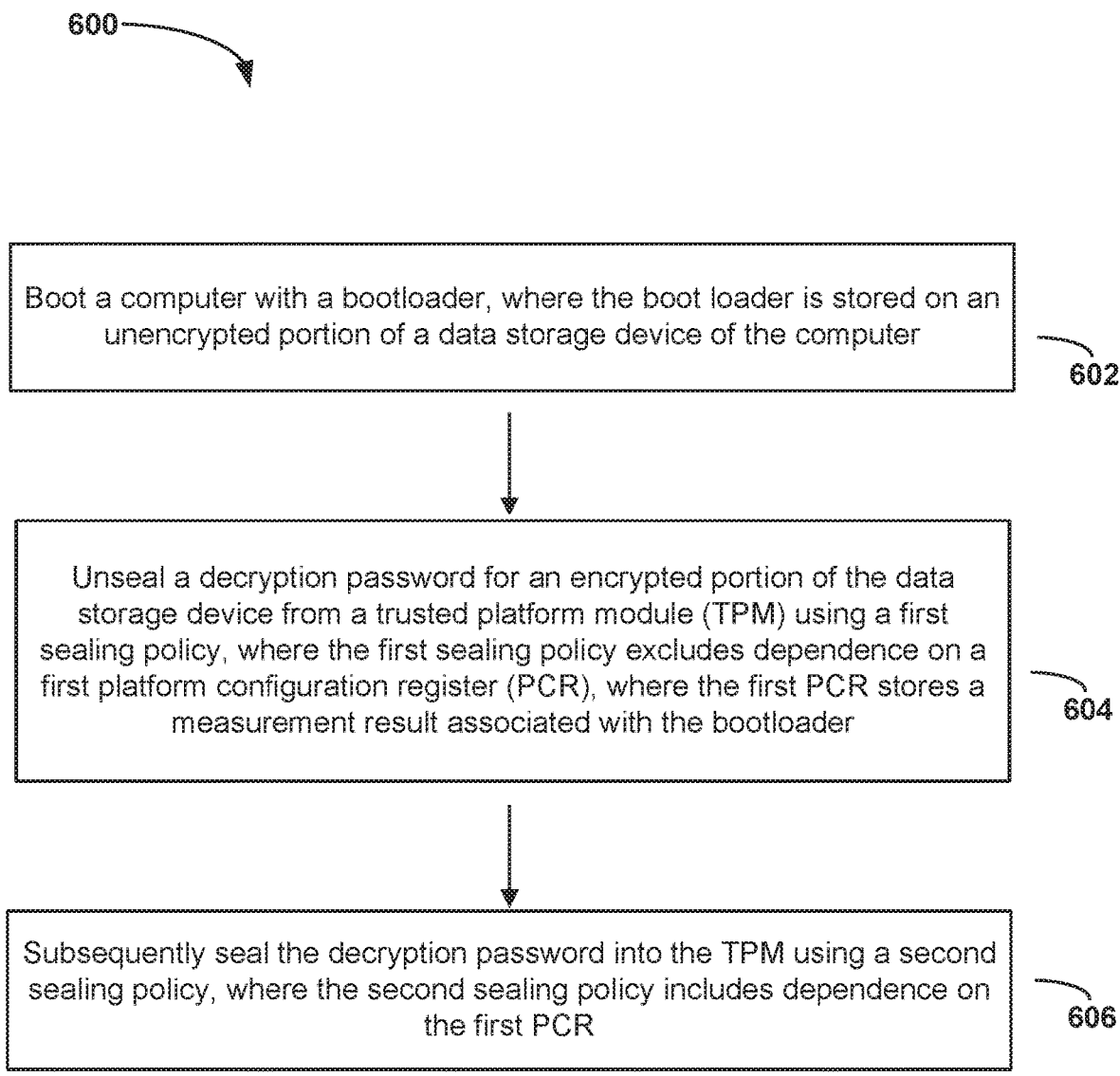
FIG. 6 is a block diagram of a method, in accordance with example embodiments.

Next, FIG. 6 is a block diagram of a method, in accordance with example embodiments. In some examples, the method may be executed on a computer, such as computer 100. Performance of the method may involve at least one processor of the computer executing program instructions stored on a non-transitory computer readable medium of the computer to perform one or more operations. In further examples, performance of the method may involve at least one processor of the computer executing program instructions stored on a removable storage device (e.g., a USB stick) attached to the computer to perform one or more operations. The computer may be an IPC node. The computer may also be a control system for a robotic device. The computer may also be a standalone workstation. The computer may include a touchscreen input device. The computer may lack a keyboard.

At block 602, method 600 includes booting a computer with a bootloader. The bootloader is executable program code stored on an unencrypted portion of a data storage device of the computer. The data storage device is a device capable of persistently storing data, such as an SSD or a hard drive. The unencrypted portion of the data storage device may be accessible without a decryption password. The data storage device may additionally include an encrypted portion which requires a decryption password to access. The data storage device may have been divided into the encrypted portion and the unencrypted portion during an imagining process using a removable storage device such as a USB stick, such as USB stick 200.

At block 604, method 600 further includes unsealing a decryption password for an encrypted portion of the data storage device from a TPM using a first sealing policy. Unsealing the decryption password involves retrieving the decryption password from the TPM (such as TPM 106) when a state of the computer matches the state of the computer when the decryption password was sealed into the TPM. The relevant components of the state of the computer are defined by the first sealing policy. The first sealing policy may identify one or more PCRs, registers of the TPM which store metrics associated with different components of the computer. The first sealing policy may not depend on a first PCR which stores a measurement result associated with the bootloader. As a result, the first sealing policy may be referred to as a weak sealing policy.

At block 606, method 600 further includes subsequently sealing the decryption password into TPM using a second sealing policy. Sealing the decryption password involves encrypting the decryption password in the TPM. After sealing the decryption password, the decryption password can only be accessed when a later state of the computer matches the state of the computer when the decryption password was sealed into the TPM. The second sealing policy may identify one or more PCRs which were not included in the first sealing policy, including the first PCR which stores a measurement result associated with the bootloader. As a result, the first sealing policy may be referred to as a strong sealing policy.

Figure 7:
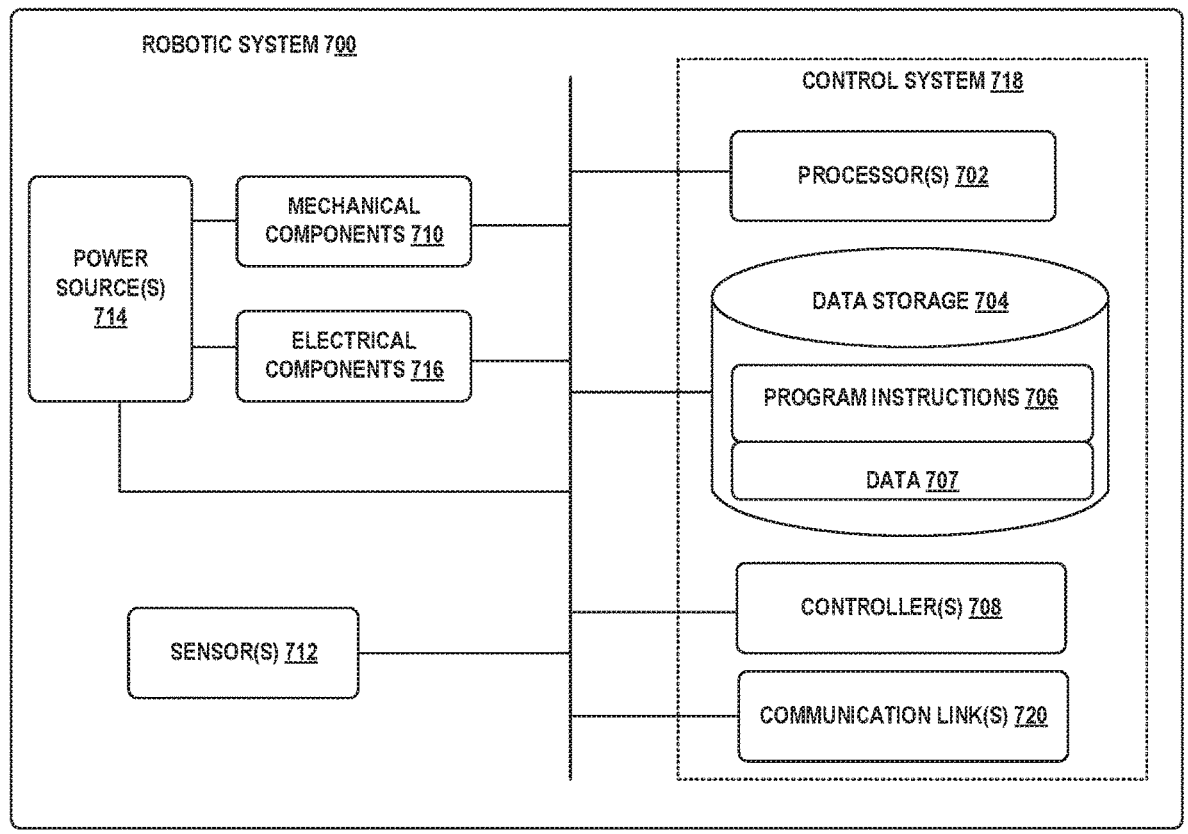
FIG. 7 illustrates a block diagram of a robotic system, in accordance with example embodiments.

Next, FIG. 7 illustrates an example configuration of a robotic system that may be used in connection with the embodiments described herein. In particular, any IPC node described herein may be a control system (e.g., control system 718) of robotic system 700. Robotic system 700 may be configured to operate autonomously, semi-autonomously, or using directions provided by user(s). Robotic system 700 may be a vehicle implemented in various forms, such as forklifts, pallet jacks, autonomous guided vehicles (AGVs), cars, or trucks. Other forms are possible as well. Furthermore, robotic system 700 may also be referred to as a robot, robotic device, mobile robot, or robotic vehicle, among other designations.

As shown in FIG. 7, robotic system 700 may include processor(s) 702, data storage 704, and controller(s) 708, which together may be part of a control system 718. Robotic system 700 may also include sensor(s) 712, power source(s) 714, mechanical components 710, electrical components 716, and communication link(s) 720. Nonetheless, robotic system 700 is shown for illustrative purposes, and may include more or fewer components. The various components of robotic system 700 may be connected in any manner, including wired or wireless connections. Further, in some examples, components of robotic system 700 may be distributed among multiple physical entities rather than a single physical entity. Other example illustrations of robotic system 700 may exist as well.

Processor(s) 702 may operate as one or more general-purpose hardware processors or special purpose hardware processors (e.g., digital signal processors, application specific integrated circuits, etc.). Processor(s) 702 may be configured to execute computer-readable program instructions 706, and manipulate data 707, both of which are stored in data storage 704. Processor(s) 702 may also directly or indirectly interact with other components of robotic system 700, such as sensor(s) 712, power source(s) 714, mechanical components 710, electrical components 716, or communication link(s) 720.

Data storage 704 may be one or more types of hardware memory. For example, data storage 704 may include or take the form of one or more computer-readable storage media that can be read or accessed by processor(s) 702. The one or more computer-readable storage media can include volatile and/or non-volatile storage components, such as optical, magnetic, organic, or another type of memory or storage, which can be integrated in whole or in part with processor(s) 702. In some embodiments, data storage 704 can be a single physical device. In other embodiments, data storage 704 can be implemented using two or more physical devices, which may communicate with one another via wired or wireless communication. As noted previously, data storage 704 may include computer-readable program instructions 706 and data 707. Data 707 may be any type of data, such as configuration data, sensor data, and/or diagnostic data, among other possibilities.

Controller 708 may include one or more electrical circuits, units of digital logic, computer chips, and/or microprocessors that are configured to (perhaps among other tasks) interface between any combination of mechanical components 710, sensor(s) 712, power source(s) 714, electrical components 716, control system 718, communication link(s) 720, or users of robotic system 700. In some embodiments, controller 708 may be a purpose-built embedded device for performing specific operations with one or more subsystems of robotic system 700.

Control system 718 may monitor and physically change the operating conditions of robotic system 700. In doing so, control system 718 may serve as a link between portions of robotic system 700, such as between mechanical components 710 or electrical components 716. In some instances, control system 718 may serve as an interface between robotic system 700 and another computer. Further, control system 718 may serve as an interface between robotic system 700 and a user. For instance, control system 718 may include various components for communicating with robotic system 700, including a touchscreen, a joystick, buttons, and/or ports, etc. The example interfaces and communications noted above may be implemented via a wired or wireless connection, or both. Control system 718 may perform other operations for robotic system 700 as well.

In some implementations, control system 718 of robotic system 700 may also include communication link(s) 720 configured to send and receive information. Communication link(s) 720 may transmit data indicating the state of the various components of robotic system 700. For example, information read by sensor(s) 712 may be transmitted via communication link(s) 720 to a separate device. Other diagnostic information indicating the integrity or health of power source(s) 714, mechanical components 710, electrical components 716, processor(s) 702, data storage 704, or controller 708 may be transmitted via communication link(s) 720 to an external communication device.

In some implementations, robotic system 700 may receive information at communication link(s) 720 that is then processed by processor(s) 702. The received information may indicate data that is accessible by processor(s) 702 during execution of program instructions 706. Further, the received information may change aspects of controller(s) 708 that may affect the behavior of mechanical components 710 or electrical components 716. In some cases, the received information may indicate a query requesting a piece of information (e.g. the operational state of one or more of the components of robotic system 700). Processor(s) 702 may subsequently transmit the piece of information back out via communication link(s) 720.

In some cases, communication link(s) 720 may include a wired connection. Robotic system 700 may include one or more ports to interface communication link(s) 720 to an external device. Communication link(s) 720 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, control system 718 may communicate with other systems of robotic system 700 via wired or wireless connections, and may further be configured to communicate with one or more users or operators of the vehicle. As one possible illustration, control system 718 may receive an input (e.g., from a central control system, from a user, or from another vehicle) indicating an instruction to move a pallet from a first location of a warehouse to a second location of the warehouse. The input to control system 718 may be received via communication link(s) 720.

Based on this input, control system 718 may perform operations to cause robotic system 700 to use sensors 712 to analyze the environment of the warehouse to locate the pallet and subsequently use mechanical components 710 to pick up and move the pallet.

Operations of control system 718 may be carried out by processor(s) 702. Alternatively, these operations may be carried out by controller 708, or a combination of processor(s) 702 and controller 708. In some embodiments, control system 718 may partially or wholly reside on a device other than robotic system 700, and therefore may at least in part control robotic system 700 remotely. Communication link(s) 720 may be used at least in part to carry out the remote communication.

Mechanical components 710 represent hardware of robotic system 700 that may enable robotic system 700 to perform physical operations. As a few examples, robotic system 700 may include physical members such robotic arm(s), wheel(s), track(s), linkage(s), and/or end effector(s). The physical members or other parts of robotic system 700 may further include motors and actuators arranged to move the physical members in relation to one another. Robotic system 700 may also include one or more structured bodies for housing control system 718 or other components, and may further include other types of mechanical components. Mechanical components 710 used in a given robot may vary based on the design of the robot, and may also be based on the operations and/or tasks the robot may be configured to perform.

In some examples, mechanical components 710 may include one or more removable components. Robotic system 700 may be configured to add and/or remove such removable components, which may involve assistance from a user and/or another robot. For example, robotic system 700 may be configured with removable arms, linkages, and/or end effectors so that these members can be replaced or changed as needed or desired based on a task robotic system 700 is expected or planned to perform. In some embodiments, robotic system 700 may include one or more removable and/or replaceable battery units or sensors. Other types of removable components may be included within some embodiments.

Robotic system 700 may include sensor(s) 712 arranged to sense aspects of robotic system 700. Sensor(s) 712 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras (e.g., a depth camera and/or a stereo camera), among other possibilities. Within some examples, robotic system 700 may be configured to receive sensor data from sensors that are physically separated from the robot (e.g., sensors that are positioned on other robots or located within the environment in which the robot is operating).

Sensor(s) 712 may provide sensor data to processor(s) 702 (perhaps by way of data 707) to allow for interaction of robotic system 700 with its environment, as well as monitoring of the operation of robotic system 700. The sensor data may be used in evaluation of various factors for activation, movement, and deactivation of mechanical components 710 and electrical components 716 by control system 718. For example, sensor(s) 712 may capture data corresponding to the terrain of the environment, location and/or identity of nearby objects (e.g., pallets, environmental landmarks), which may assist with environment recognition and navigation. In an example configuration, sensor(s) 712 may include RADAR (e.g., for long-range object detection, distance determination, and/or speed determination), LIDAR (e.g., for reflector detection, short-range object detection, distance determination, and/or speed determination), SONAR (e.g., for underwater object detection, distance determination, and/or speed determination), VICON® (e.g., for motion capture), one or more cameras (e.g., stereoscopic cameras for three-dimensional (3D) vision), a global positioning system (GPS) transceiver, and/or other sensors for capturing information of the environment in which robotic system 700 is operating. Sensor(s) 712 may monitor the environment in real time, and detect obstacles, elements of the terrain, weather conditions, temperature, and/or other aspects of the environment.

Further, robotic system 700 may include sensor(s) 712 configured to receive information indicative of the state of robotic system 700, including sensor(s) 712 that may monitor the state of the various components of robotic system 700. Sensor(s) 712 may measure activity of systems of robotic system 700 and receive information based on the operation of the various features of robotic system 700, such as the operation of wheels, linkages, actuators, end effectors, and/or other mechanical and/or electrical features of robotic system 700. The data provided by sensor(s) 712 may enable control system 718 to determine errors in operation as well as monitor overall operation of components of robotic system 700.

Sensor(s) 712 may include one or more velocity and/or acceleration sensors. Sensor(s) 712 may measure both linear and angular velocity and/or acceleration. For instance, sensor(s) 712 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of robotic system 700 based on the location of the IMU in robotic system 700 and the kinematics of robotic system 700.

Robotic system 700 may include other types of sensors not explicated discussed herein. Additionally or alternatively, robotic system 700 may use particular sensors for purposes not enumerated herein.

Robotic system 700 may also include one or more power source(s) 714 configured to supply power to various components of robotic system 700. Among other possible power systems, robotic system 700 may include a hydraulic system, electrical system, batteries, and/or other types of power systems. As an example illustration, robotic system 700 may include one or more batteries configured to provide charge to components of robotic system 700. Some of mechanical components 710 or electrical components 716 may each connect to a different power source, may be powered by the same power source, or be powered by multiple power sources.

Any type of power source may be used to power robotic system 700, such as electrical power or a gasoline engine. Additionally or alternatively, robotic system 700 may include a hydraulic system configured to provide power to mechanical components 710 using fluid power. Power source(s) 714 may charge using various types of charging, such as wired connections to an outside power source, wireless charging, combustion, or other examples.

Electrical components 716 may include various mechanisms capable of processing, transferring, and/or providing electrical charge or electric signals. Among possible examples, electrical components 716 may include electrical wires, circuitry, and/or wireless communication transmitters and receivers to enable operations of robotic system 700. Electrical components 716 may interwork with mechanical components 710 to enable robotic system 700 to perform various operations. Electrical components 716 may be configured to provide power from power source(s) 714 to mechanical components 710, for example. Further, robotic system 700 may include electric motors. Other examples of electrical components 716 may exist as well.

Although not shown in FIG. 7, robotic system 700 may include a chassis and/or an operator cabin, which may connect to or house components of robotic system 700. The structure of the chassis and/or cabin may vary within examples and may further depend on operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry sensor(s) 712. These sensors may be positioned in various locations on robotic system 700, such as on top of the chassis to provide a high vantage point for sensor(s) 712.

Robotic system 700 may carry a load, such as a type of cargo that is to be transported. The load may also represent external batteries or other types of power sources (e.g., solar panels) that robotic system 700 may utilize. Carrying the load represents one example use for which robotic system 700 may be configured, but robotic system 700 may be configured to perform other operations as well.

Control system 718 may lack a keyboard for password entry. Additionally, control system 718 may include a user interface which is operated by different users at different times, with each user controlling the same robotic system 700. Consequently, the systems and methods for IPC imaging and boot processes described herein may be particularly beneficial in the context of control system 718 or a different robotic control system. Other applications outside the robotics space are also contemplated. For instance, the imaging and boot processes described herein may also be used for a standalone computer workstation to avoid the need for password entry in a secure manner.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    booting a computer with a bootloader, wherein the bootloader is stored on an unencrypted portion of a data storage device of the computer;
    during the booting of the computer with the bootloader, unsealing a decryption password for an encrypted portion of the data storage device from a trusted platform module (TPM) using a first sealing policy, wherein the first sealing policy is based on a first set of one or more platform configuration registers (PCRs) that does not include a first PCR, wherein the first PCR stores a measurement result associated with the bootloader; and
    during the booting of the computer with the bootloader and after unsealing the decryption password from the TPM using the first sealing policy, sealing the decryption password into the TPM using a second sealing policy, wherein the second sealing policy is based on a second set of one or more PCRs that does include the first PCR.

2. The method of claim 1, further comprising:
    using a temporary encryption key associated with a removable storage device attached to the computer to decrypt the decryption password after unsealing the decryption password from the TPM using the first sealing policy and before subsequently sealing the decryption password into the TPM using the second sealing policy.

3. The method of claim 2, wherein the temporary encryption key is based on a static certificate stored on the removable storage device.

4. The method of claim 1, further comprising initially sealing the decryption password for the encrypted portion of the data storage device into the TPM using the first sealing policy.

5. The method of claim 4, further comprising booting the computer with a bootloader stored on a removable storage device before initially sealing the decryption password into the TPM using the first sealing policy.

6. The method of claim 5, wherein the bootloader stored on the removable storage device is different than the bootloader stored on the unencrypted portion of the data storage device of the computer.

7. The method of claim 5, wherein the removable storage device is a universal serial bus (USB) stick.

8. The method of claim 5, further comprising encrypting the decryption password using a temporary encryption key associated with the removable storage device before initially sealing the decryption password into the TPM.

9. The method of claim 5, further comprising:
    partitioning the data storage device of the computer into the encrypted portion and the unencrypted portion after booting the computer with the bootloader stored on the removable storage device.

10. The method of claim 1, wherein the first sealing policy depends on a second PCR, wherein the second PCR stores a measurement result associated with a basic input/output system (BIOS) of the computer.

11. The method of claim 1, wherein sealing the decryption password into the TPM using the second sealing policy is performed by executing program code stored on an encrypted portion of the data storage device.

12. The method of claim 11, wherein the program code was copied to the data storage device from a removable storage device during an imaging process.

13. The method claim 1, wherein the second sealing policy depends on a boot source, and wherein the first sealing policy does not depend on the boot source.

14. A computer, comprising a non-transitory computer readable medium containing instructions executable by at least one processor of the computer to cause the at least one processor to perform operations comprising:
    booting the computer with a bootloader, wherein the bootloader is stored on an unencrypted portion of a data storage device of the computer;
    during the booting of the computer with the bootloader, unsealing a decryption password for an encrypted portion of the data storage device from a trusted platform module (TPM) using a first sealing policy, wherein the first sealing policy is based on a first set of one or more platform configuration registers (PCRs) that does not include a first PCR, wherein the first PCR stores a measurement result associated with the bootloader; and
    during the booting of the computing with the bootloader and after unsealing the decryption password from the TPM using the first sealing policy, sealing the decryption password into the TPM using a second sealing policy, wherein the second sealing policy is based on a second set of one or more PCRs that does include the first PCR.

15. The computer of claim 14, wherein the operations further comprise after unsealing the decryption password from the TPM using the first sealing policy, removing dependence of the decryption password on an identifier associated with a removable storage device attached to the computer before sealing the decryption password into the TPM using the second sealing policy.

16. The computer of claim 14, wherein the computer comprises a control system for a robotic device.

17. The computer of claim 14, wherein the computer comprises a touchscreen input device.

18. The computer of claim 14, wherein the computer lacks a keyboard for password entry.

19. The computer of claim 14, wherein both the first sealing policy and the second sealing policy depend on a second PCR, wherein the second PCR stores a measurement result independent of the bootloader.

20. A non-transitory computer readable medium containing instructions executable by at least one processor of a computer to cause the at least one processor to perform operations comprising:
    booting the computer with a bootloader, wherein the bootloader is stored on an unencrypted portion of a data storage device of the computer;
    during the booting of the computer with the bootloader, unsealing a decryption password for an encrypted portion of the data storage device from a trusted platform module (TPM) using a first sealing policy, wherein the first sealing policy is based on a first set of one or more platform configuration registers (PCRs) that does not include a first PCR, wherein the first PCR stores a measurement result associated with the bootloader; and
    during the booting of the computer with the bootloader and after unsealing the decryption password from the TPM using the first sealing policy, sealing the decryption password into the TPM using a second sealing policy, wherein the second sealing policy is based on a second set of one or more PCRs that does include the first PCR.

* * * * *